Aug. 14, 1951  P. H. DE LA COUR  2,564,521
TOOL HOLDER EJECTING MECHANISM
Filed April 21, 1949
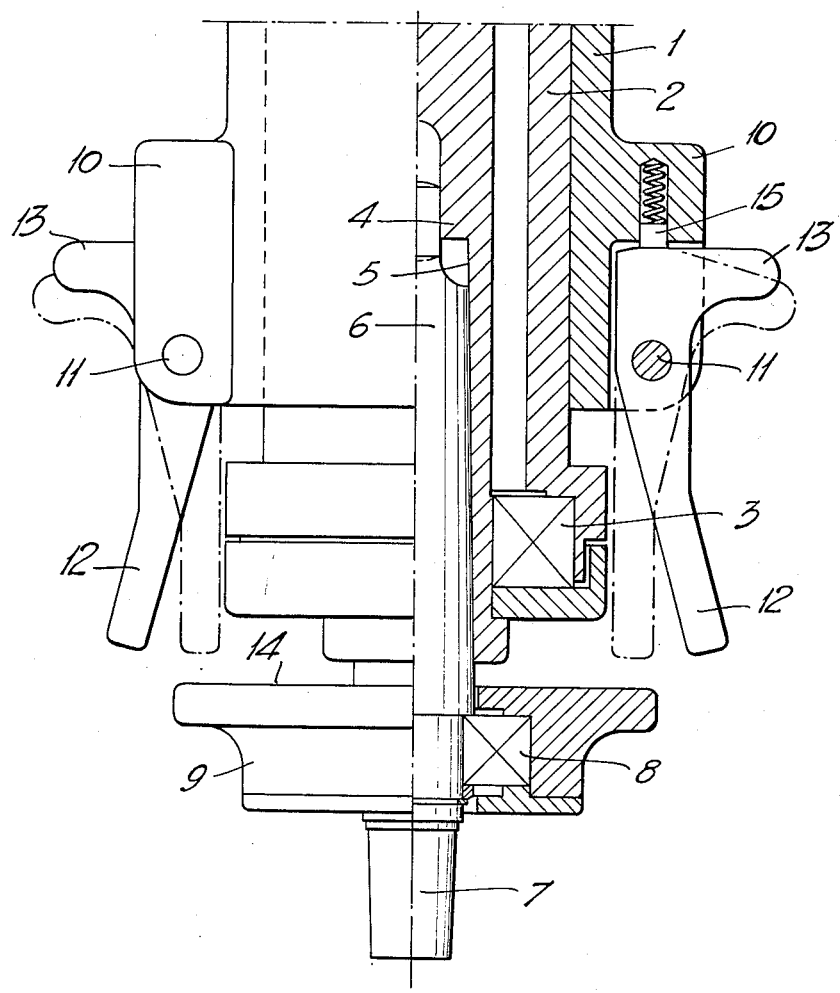
Inventor
Paul Hroar de la Cour
by Sommers & Young
Attorneys Patented Aug. 14, 1951

2,564,521

UNITED STATES PATENT OFFICE 2,564,521

TOOLHOLDER EJECTING MECHANISM

Paul Hroar de la Cour, Arboga, Sweden

Application April 21, 1949, Serial No. 88,831
In Sweden May 14, 1948

5 Claims. (Cl. 77—55)

The present invention relates to a mechanism for releasing the tool holder of a machine tool, such as the drill holder of a boring machine. The invention has reference more particularly to that type of machine tools in which the tool holder is connected to a rotatable and longitudinally reciprocable working spindle by a frictional engagement between conical or wedge-shaped male and female elements.

An object of the invention is to provide a mechanism for effecting the release of said engagement in a simple and reliable way and without the risk of damaging the tool by dropping the tool holder when released.

Another object of the invention is to provide a mechanism of the type set forth which permits releasing of the work holder not only when the machine tool is at rest but also during the operation thereof, thereby enabling replacement of the tool without stopping the machine.

A feature of the invention involves the provision of an annular member rotatably mounted on the tool holder for presenting a stop surface which can be held against rotation with the tool holder, and the provision on the stationary housing for the working spindle of stop means for cooperation with said stop surface in order to prevent the said annular member and the tool holder from moving with the working spindle when retracted from operative to inoperative position.

According to another feature of the invention said stop means are so constructed and arranged that they may be readily brought to and removed from operative position by hand.

A further feature of the invention involves the provision of means for maintaining the stop means in either of said positions under the action of springs.

In the accompanying drawing a mechanism embodying this invention is illustrated, partly in elevation and partly in axial section. It should be noted, however, that the invention is by no means limited to this embodiment which is shown as an example only.

In the drawing, the tool proper is not shown, because the mechanism forming the object of the invention has not for its purpose to release the tool proper from its holder but to release the tool holder from the working spindle of the machine.

With reference to the drawing, the reference numeral 1 indicates the stationary housing for the working spindle of the machine tool (not otherwise shown). Slidably mounted in said housing 1 is a sleeve or bushing 2 which may be reciprocated axially by means, not shown, which may be of well-known character. Rotatably mounted in the bushing 2, as by means of an antifriction bearing 3, is the working spindle 4 of the machine tool, which may, for instance, be a boring machine. Formed in the working spindle is a conical boring 5 for receiving the correspondingly conical stem of the tool holder 6. The tool holder is formed in well-known way with a slightly conical stud 7 at its bottom end for engaging a correspondingly conical boring in the top or head of the tool proper.

Rotatably mounted on the tool holder, as by means of an antifriction bearing 8, is an annular member 9 shaped as a disc or wheel which may be of such a design as to constitute a protection for said bearing 8, so that the bearing cannot be damaged by chips or the like.

The housing 1 for the working spindle is formed with a pair of integral ears 10. Pivoted to each such ear, by means of a tangentially extending pivot 11, is a bell crank lever comprising a depending lower arm 12 and a substantially radially projecting arm 13. By moving the bell crank levers on their pivots 11 their lower arms 12 may be shifted into and out of a position in which their bottom ends are positioned right above the top surface 14 of the disc or wheel 9 near the periphery thereof. This position is shown by dotted lines in the drawing and is hereinafter referred to as the operative position of arms 12. When the arms 12 are removed from said operative position, they occupy the position shown by full lines, hereinafter referred to as their inoperative position. In said inoperative position the disc or wheel 9 may freely move lengthwise with the tool holder 6 when the bushing 2 together with the working spindle 3 is raised to bring the tool proper out of engagement with the work piece.

When the arms 12 are in their operative position, the disc or wheel 9 will strike the bottom ends of the arms 12 by its top surface 14 after a slight raising of the bushing and working spindle. Thus, the disc or wheel 9 is prevented from partaking in the continued raising of the spindle and in turn keeps the tool holder 6 from moving with the working spindle 4. As a result, the tool holder 6 is released from its engagement in the working spindle 4.

Because of the rotatable mounting of the disc or wheel 9 on the tool holder 6 the releasing operation above described may be effected even while the spindle is rotating. The rotatable mounting of the disc or wheel 9 also permits grasping it by hand and keeping it against rotation during the releasing operation. By this means the tool holder 6 and tool proper may be prevented from dropping when released.

In order to facilitate such grasping of the disc or wheel 9 by hand the disc or wheel may be suitably profiled, as indicated in the drawing.

The setting of the stop arms 12 to operative position may be controlled manually by directly pushing the arms inwards. The retraction of the arms 12 to inoperative position may be effected by an upward pressure by the finger on the outwardly projecting upper arms 13 of the bell crank levers.

By means of spring controlled pins 15 mounted in borings in the ears 10 which bear against suitably shaped areas of the top surface of the upper lever arms 13, the bell crank levers may be held by a certain power in either of their set positions, as indicated in the drawing.

As already stated the invention may take other forms than that shown and described without departing from the scope of the invention as defined by the appended claims.

Furthermore, the invention may be applied also to machine tools in which the working spindle is, say, horizontal instead of vertical.

What I claim is:

1. In a mechanism for releasing the tool holder from a machine tool, the combination with a stationary housing, a working spindle rotatably and slidably mounted in said housing and a tool holder in frictional engagement with said working spindle, of an annular member rotatably mounted on said tool holder for affording a stop surface which can be held against rotation with the tool holder, and stop members mounted on said stationary housing for cooperation with said stop surface to prevent said annular member and the tool holder carrying same from moving with the working spindle when the latter is retracted from operative to inoperative position.

2. In a mechanism as claimed in claim 1, the further feature that the annular member is mounted on the tool holder by means of an anti-friction bearing and shaped as a protecting housing therefor.

3. In a mechanism as claimed in claim 1, the further feature that the annular member rotatably mounted on the tool holder comprises a wheel of a profile suited for grasping the wheel by hand.

4. In a mechanism as claimed in claim 1, the further feature that the stop members comprise bell crank levers pivoted to the housing for the working spindle and manually settable into and out of a position in which one of their arms is situated in the path of the stop surface of the annular member rotatably mounted on the tool holder.

5. In a mechanism as claimed in claim 4 the provision in said housing of spring loaded means for holding the bell crank levers in either of their operative and inoperative positions.

PAUL HROAR DE LA COUR.

REFERENCES CITED

The following references are of record in the file of this patent:

UNITED STATES PATENTS

| Number | Name | Date |
| --- | --- | --- |
| 739,946 | Straub | Sept. 29, 1903 |
| 1,934,044 | De Leeuw | Nov. 7, 1933 |
| 2,313,623 | Bungay | Mar. 9, 1943 |
| 2,341,051 | Lustrick | Feb. 8, 1944 |